March 15, 1932. W. A. GORDON 1,849,292
MACHINE FOR PLASTICATING MATERIALS
Filed April 19, 1930 2 Sheets-Sheet 2

INVENTOR:
William A. Gordon,
By Attorneys,

Patented Mar. 15, 1932

1,849,292

UNITED STATES PATENT OFFICE

WILLIAM A. GORDON, OF SHELTON, CONNECTICUT, ASSIGNOR TO FARREL-BIRMINGHAM COMPANY, INCORPORATED, OF ANSONIA, CONNECTICUT, A CORPORATION OF CONNECTICUT

MACHINE FOR PLASTICATING MATERIALS

Application filed April 19, 1930. Serial No. 445,665.

This invention relates to machines for working rubber, being principally directed to the so-called "plasticating" of rubber.

In a prior application filed by me, Serial No. 357,396, I have described and claimed a machine of this type in which the operation is divided into two stages, preferably each of the two stages being performed in separate cylinders lying side by side, and, more specifically, arranged one above the other. The present invention is particularly directed to an improvement on this type of machine, although it is applicable to any machine wherein similar operations are performed. In the construction described in said application, the material to be plasticated (usually rubber) is worked in the upper cylinder by means of a plasticating screw, and the output of this after having passed the first stage of the plastication is fed to the second cylinder where the plasticating operation is completed. The present invention relates to a means for controlling and regulating the operation of the first stage of the apparatus and the feed of the material to the second stage. The general construction and novel features of the present invention will be hereinafter more fully described. The invention also covers other features of improvement which will be hereinafter more fully described.

Referring to the drawings which illustrate one form of the invention:

Figure 1:
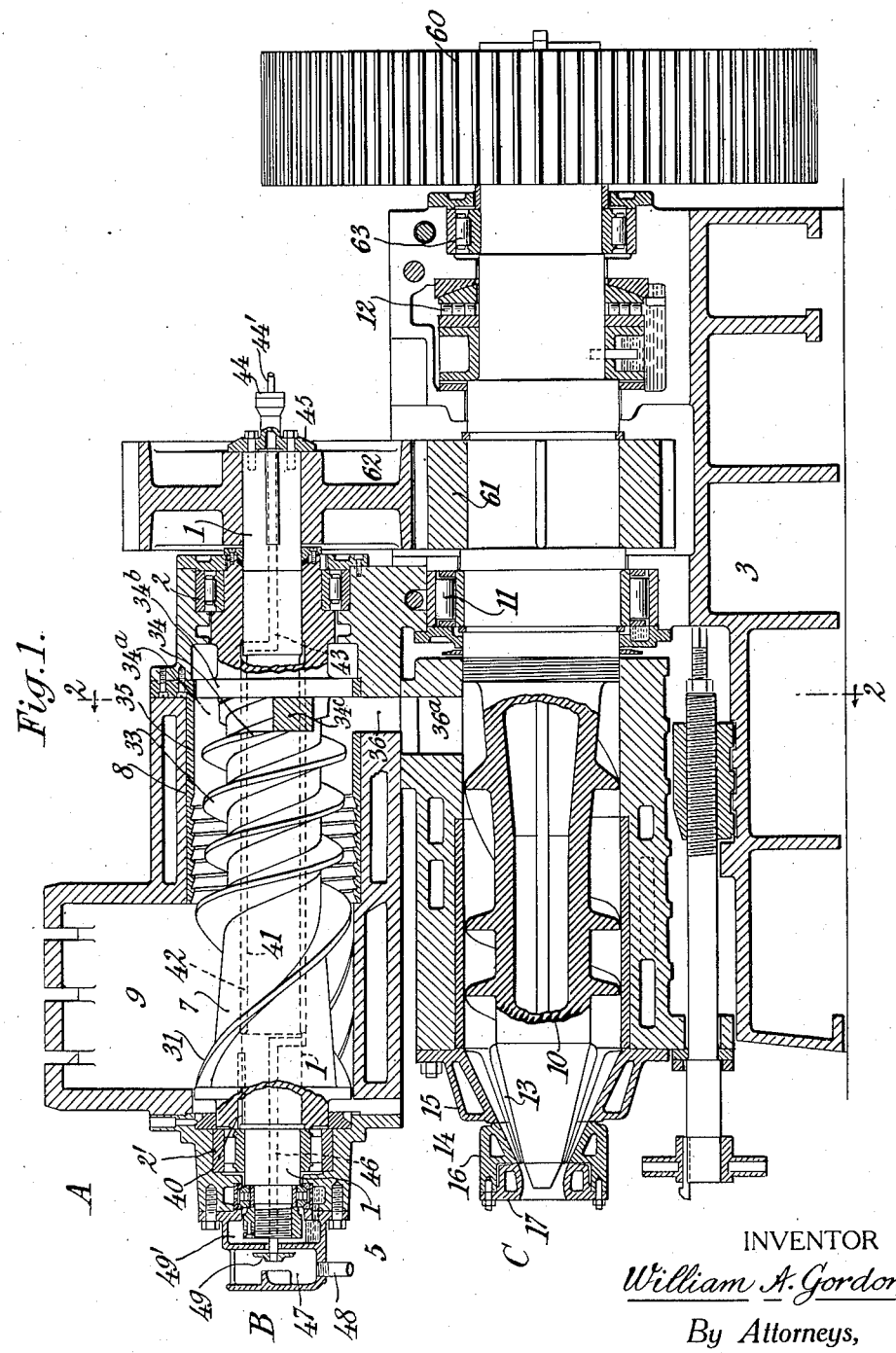
Figure 1 is a longitudinal vertical section of a machine of the kind set forth in said application.
Figure 2:
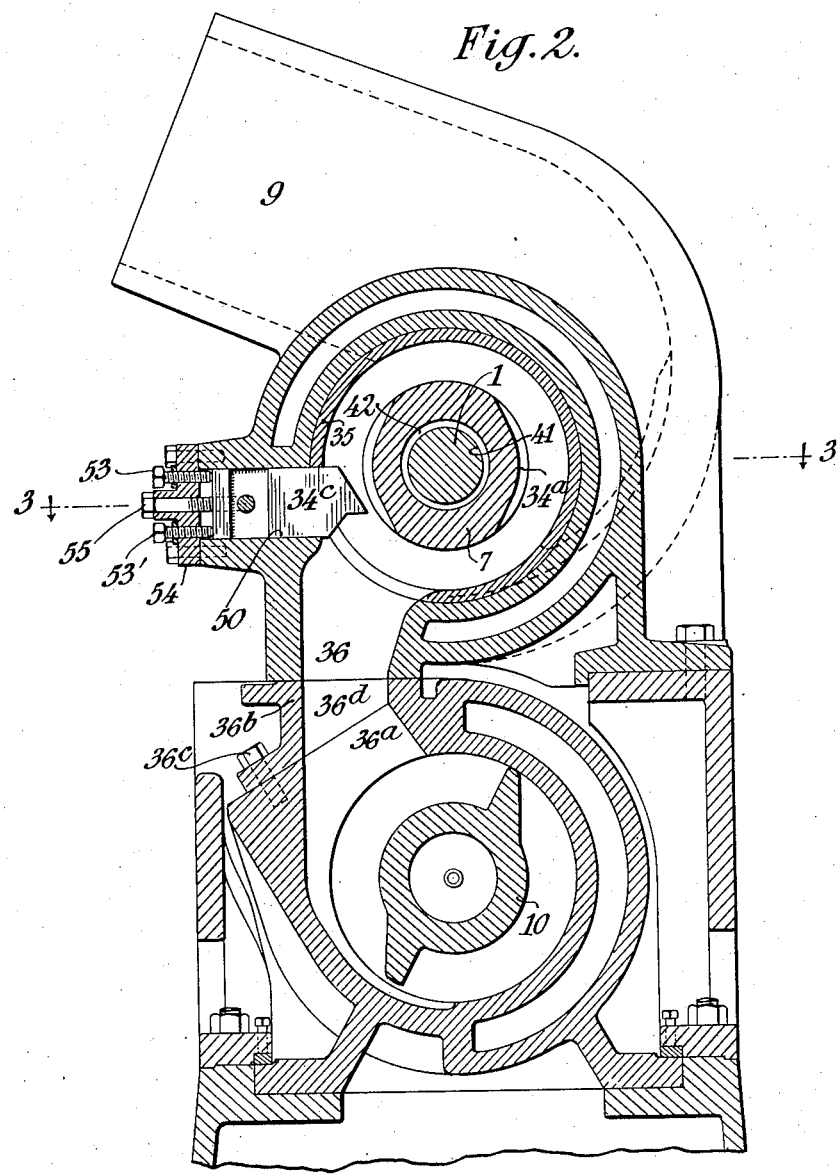
Fig. 2 is a cross-section taken approximately on line 2—2 in Figure 1.

Referring first to Figs. 1 and 2, let A indicate the machine as a whole, which in its preferred form is shown as comprising apparatus for dealing with rubber in two stages, the first stage taking place in section B and the second stage in section C.

Referring first to the upper section B, it comprises a shaft 1 which is preferably mounted to rotate in ball or roller bearings 2, 2' formed to be supported by the casing 3. A double thrust bearing 5 is preferably introduced near the bearing 2'. The shaft 1 is provided on its exterior with a screw-threaded member 7 of large diameter and volumetric efficiency, this being formed hollow, and being slipped over the shaft and keyed thereto, as shown. The form of thread is preferably that indicated in the drawings, wherein there is a feeding section 31 of quick pitch, which is designed to receive the rubber fed into the machine through the hopper 9, and to cut or crush the rubber from the main piece or pieces, feeding it rearwardly, so that it comes under the influence of section 33. The section 33 is of much slower pitch, and is best constructed so that the succeeding threads or convolutions are at varying distances from the interior of the casing. A separate lining 35 is best provided on the interior, which lining may be removed when worn. The section B of the machine is the initial or first stage plasticator, and in it the rubber is squeezed through the narrow passages between the tops of the worm threads and the lining 35, which gives a preliminary working to the rubber and develops considerable heat.

To the right of the point 34 which marks the extreme right-hand end of the full-sized thread, 1 provide a groove $34^a$, which groove, in radial dimension, is preferably not so deep as to entirely destroy the thread, but which, on the contrary, leaves the base of the thread still intact. The right-hand side of the groove is marked by a flange $34^b$ which stops the flow of the material to the right. This groove to an extent forms a collecting chamber for the material, and also a stripping chamber for the latter, it being understood that there is to some degree a tendency for the material to rotate with the screw.

Referring now to the lower section C, it comprises a screw shaft 10, suitably mounted in the casing 3 as by roller bearings 11 and 63. It is also provided, preferably at the extreme right, with an adjustable thrust bearing 12. The screw threads on the shaft 10 are of large capacity, which capacity is reduced toward the delivery end of the shaft, at which end the screw shaft 10 is provided with a tip 13 which is preferably of conical form and grooved or corrugated on its exterior. The tip 13 works in a head portion 14, which comprises two sections 15 and 16 which are best water-jacketed, as shown. A die 17 is preferably used which gives the issuing product whatever cross-section is desired for the subsequent operations.

The main features thus referred to are shown and described in the aforesaid application to which reference may be made for a more detailed description.

In the machine of such application, the upper cylinder was provided with a discharge opening 36, through which the output of the upper cylinder dropped into the hopper or receiving opening 36ª of the lower cylinder which was arranged immediately beneath the discharge opening 36 and spaced apart therefrom. The area of the discharge opening 36 was varied by a so-called gate or valve, with the purpose of controlling the output, and between such gate or valve and the upper screw was located a fixed plow.

Figure 3:
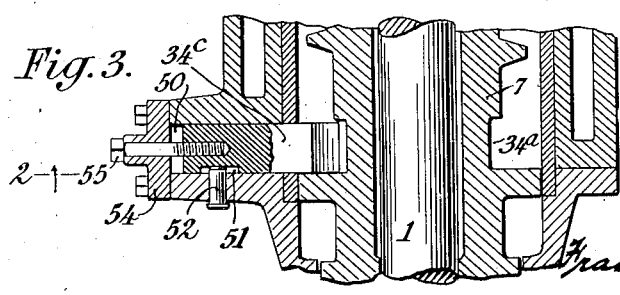
Fig. 3 is a partial longitudinal section taken on the line 3—3 in Fig. 2.

I have found in practice that superior results are obtained if the discharge opening of the upper cylinder and the inlet opening of the lower cylinder are constructed as one substantially complete passage, as shown in Figs. 1 and 3 of the drawings. In these figures the discharge opening 36 and inlet opening 36ª are, as a matter of convenience, connected by a filler piece 36ᵇ fastened to the lower cylinder by bolts 36ᶜ or the like. This filler piece is provided with a passage 36ᵈ, the upper edge of which forms a fairly close fit with the lower edge of the wall of the passage 36. It will be understood that this need not be a leak-tight fit, and may be so arranged as to permit adjustment of the lower cylinder with regard to the upper cylinder. In effect, however, it provides a substantially closed passage through which the output of the upper cylinder can be guided, and to a material extent forced into the lower cylinder.

The invention also provides an improvement in the plow structure indicated in the aforesaid application. According to the present invention I provide a plow which is capable of lateral adjustment toward and from the upper screw, this plow being designated by the reference numeral 34ᶜ. The plow lies in the groove 34ª and is designed to strip the material which clings to the screw and divert it downwardly into the discharge opening. The plow is mounted in a square bore or opening 50 formed in the upper framework, and is capable of horizontal adjustment with relation to the screw, this adjustment being best limited by a slot 51, into which the end of a pin 52 projects so that there is no danger of the end of the plow engaging the bottom of the groove 34ª. The adjustments of the plow are preferably secured through set screws 53, 53′, which are screw-threaded into openings formed in a cap plate 54, the inner ends of the screws bearing against the outer end of the plow. For the purpose of preventing forward motion a central screw 55 is provided which passes through a plain opening in the cap and is threaded into the plow.

The construction thus described is of considerable value in connection with the operation of my two-stage plasticator. The function of the plow is to divert material which is carried by the screw within the groove 34ª into the discharge channel 36, and also to regulate to some extent the flow of the material in the upper cylinder. The closed passageway between the two cylinders not only insures that there will be no spillage of partly plasticated rubber if the output of the upper cylinder is more than the lower cylinder can take, but also tends to assist in controlling the feed of the upper cylinder to the lower. Probably the condition is that if there is a tendency to such overplus of output it will be resisted by the back pressure of the material lying in the passageway between the two cylinders which cannot readily escape. The combination between the plow and the closed passageway results in the capacity for nice adjustment between the output of the upper cylinder and the input of the lower cylinder, and insures an even, steady flow of material through the complete machine.

The invention also includes certain other features of improvement which render the machine more simple, compact and durable. As before alluded to, the upper screw member 7 is formed separately from the shaft 1, the parts being united by a key, such as is shown at 40. This permits replacement of the screw member 8 in case of damage or destruction, while permitting the retention of the shaft which is little liable to damage or wear. For the purpose of water-cooling the screw member, the shaft has a reduced portion 41 which forms a chamber 42 between the interior of the screw member 7 and the shaft 1. This chamber may be supplied with water through a bored passage 43, leading to a pipe 44′ which passes through a stuffing box 44, which is secured by a plate 45 to the end of the shaft. By this construction the shaft is permitted to rotate with the pipe stationary. At the opposite end, the shaft is similarly bored for the passage of water, as shown at 46, and leads to a chamber 47 which has a discharge pipe 48 leading therefrom. Preferably the top of the chamber 47 is open, so that the drainage from the chamber can be inspected, and the shaft may be provided with a baffle plate 49 for preventing spattering of the water back into the oil chamber 49′. By this construction the shaft in connection with the screw member 1 always constitutes a water-cooling system without the necessity of providing any channels or passages in the screw member 7. It will be understood that at times it may be desirable to use this water-cooling system as a water or steam heating system, the construction sufficing for either.

In the construction shown, the machine is driven by a large gear 60 which is keyed on the end of the screw member 10, as shown, so that the latter is turned by the gear, and power is transmitted to the upper shaft 1 by gears 61—62, keyed respectively to the shaft 10 and the shaft 1. As shown, the thrust bearing 12 is located outside of the gears 61 and 62, and the second roller bearing 63 is located beyond the thrust bearing.

While I have shown and described one form of the invention, I do not wish to be limited thereto since various changes may be made therein without departing from the invention.

While I have shown the two stages of the machine as separated and arranged side by side, it will be understood that any other disposition of the same may be adopted.

What I claim is:

1. A machine for plasticating materials, comprising a screw member for initial plastication, a screw member for additional plastication, a groove at the end of the first screw member, an adjustable plow working in said groove for diverting partially plasticated material, and a substantially closed passage leading from the first screw to the second screw.

2. A machine for plasticating materials, comprising a screw member adapted to partially plasticate the materials and having a groove at its rear end, a casing for said screw member, a second screw member mounted beneath the first screw member and having a casing arranged below the first casing, a substantially closed passageway leading from the one casing to the other, and a plow projecting into said groove for diverting the material into said passageway, and said plow being adjustable, and having means for holding it in its adjusted positions.

3. A screw for plasticating or the like, comprising a hollow member carrying screw threads, and a shaft passing through said hollow member, such shaft having a reduced portion constituting with said screw threaded member a water-chamber, and means for leading water to and from said chamber.

4. A machine for plasticating materials, comprising a shaft, bearings for said shaft, and means for driving it, a hollow screw member fixed to said shaft, the internal diameter of said screw member and the external diameter of said shaft being such that a water-chamber is formed between the two for a portion of the length of the screw member, and means for leading water through said shaft to said water-chamber and out of said shaft to discharge the water.

5. A machine for plasticating materials, comprising a screw member, a casing for said screw member, a shaft passing through said screw member and having bearings in said casing, said shaft having a reduced diameter for part of its length opposite said screw member, whereby to form a water passage between said shaft and said screw member, a central bore leading through one end of said shaft to said passage for conducting water thereto, and a central bore through the other end of said shaft for conducting water from said passage to the exterior.

6. A screw for manipulating materials, comprising a hollow member carrying the screw threads and a shaft passing through said hollow member, the shaft and hollow member being so constructed that a water chamber is left between the two.

In witness whereof, I have hereunto signed my name.

WILLIAM A. GORDON.